(12) United States Patent
Biswas et al.

(10) Patent No.: US 9,158,685 B2
(45) Date of Patent: Oct. 13, 2015

(54) SYSTEM CACHE WITH CACHE HINT CONTROL

(75) Inventors: Sukalpa Biswas, Fremont, CA (US); Shinye Shiu, Los Altos, CA (US); James Wang, Vista, CA (US)

(73) Assignee: Apple Inc., Cupertino, CA (US)

( * ) Notice: Subject to any disclaimer, the term of this patent is extended or adjusted under 35 U.S.C. 154(b) by 352 days.

(21) Appl. No.: 13/610,829

(22) Filed: Sep. 11, 2012

(65) Prior Publication Data

US 2014/0075125 A1    Mar. 13, 2014

(51) Int. Cl.
*G06F 12/08*    (2006.01)

(52) U.S. Cl.
CPC ............ *G06F 12/08* (2013.01); *G06F 12/0815* (2013.01)

(58) Field of Classification Search
CPC .. G06F 12/08; G06F 12/0815; G06F 12/0871
USPC ............................ 711/137, 133, 145, 12.07 E
See application file for complete search history.

(56) References Cited

U.S. PATENT DOCUMENTS

| | | | |
|---|---|---|---|
| 6,901,485 B2 | 5/2005 | Arimilli et al. | |
| 7,437,521 B1 | 10/2008 | Scott et al. | |
| 7,526,608 B2 | 4/2009 | Yasue | |
| 7,716,423 B2 * | 5/2010 | Irish et al. | 711/133 |
| 8,200,917 B2 * | 6/2012 | Yu et al. | 711/155 |
| 2002/0046326 A1 * | 4/2002 | Devereux | 711/128 |
| 2002/0078302 A1 * | 6/2002 | Favor | 711/133 |
| 2007/0067505 A1 * | 3/2007 | Kaniyur et al. | 710/22 |
| 2007/0168620 A1 * | 7/2007 | Leonard et al. | 711/141 |

* cited by examiner

*Primary Examiner* — Pierre-Michel Bataille
(74) *Attorney, Agent, or Firm* — Rory D. Rankin; Meyertons, Hood, Kivlin, Kowert & Goetzel, P.C.

(57) ABSTRACT

Methods and apparatuses for utilizing a cache hint mechanism in which a requesting agent can provide hints as to how data corresponding to a request should be cached in a system cache within a memory controller. The way the system cache responds to received requests is determined by the cache hint provided by the originating requesting agent. When a request is accompanied by a de-allocate cache hint, the system cache causes a cache line hit by the request to be de-allocated. For a request with a do not allocate cache hint, the system cache does not allocate a cache line if the request misses in the system cache, and the system cache maintains a given cache line in its current state if the requests hits the given cache line.

24 Claims, 10 Drawing Sheets

*Cache Hint Table*
*114*

| Attribute | Value |
|---|---|
| No Hint | 000 |
| Allocate Normal | 001 |
| Allocate Sticky | 010 |
| Do Not Allocate | 011 |
| De-Allocate (Set LRU) | 100 |
| Reserved | 101-111 |

*FIG. 6*

SYSTEM CACHE WITH CACHE HINT CONTROL

BACKGROUND

1. Field of the Invention

The present invention relates generally to data caches, and in particular to methods and mechanisms for optimizing a system cache located in a memory controller.

2. Description of the Related Art

Modern day mobile electronic devices often include multiple components or agents sharing access to one or more memory devices. These multiple agents may make large numbers of requests to memory, and as the number of these requests increases, the power consumption of the device increases, which limits the battery life of the device. One approach for reducing power consumption is to try to reduce the number of times that off-chip memory is accessed by caching data in or near the processor.

Conventional caches are typically coupled to or nearby a processor and store data that is frequently accessed by the processor to reduce latency. In a conventional cache, data may be retained in the cache based on the temporal locality of accesses. For example, when a line is allocated in the cache, the more times the line is referenced, the more difficult it becomes to have this line replaced. However, conventional caches are not designed for storing data that is accessed multiple times when the accesses are widely spaced in time. Such data would tend to get evicted in a traditional cache.

SUMMARY

Systems, memory controllers, caches, and methods for implementing a cache hint mechanism in which a requestor can provide hints as to how data corresponding to a request should be cached are disclosed. In a system on chip, multiple agents may be coupled to a memory controller which in turn may be coupled to one or more memory devices. The multiple agents may access the memory device(s) via the memory controller. The memory controller may include a system cache configured to store data for the purposes of reducing the number of requests that access off-chip memory.

The system cache may be shared by multiple agents with different types of access patterns than a typical processor cache would experience. Some cache lines may be referenced multiple times but they may not be referenced in a temporally local fashion. The system cache may not know which lines will be reused, and so a requesting agent may determine how lines are allocated in the system cache.

In one embodiment, a requesting agent may send a request accompanied by a group ID and a cache hint. The cache hint may be set to any of various values, depending on the type of data being referenced by the request. In response to receiving the cache hint, the system cache is configured to determine whether and how to allocate cache lines corresponding to the request based on the type of cache hint received.

In various embodiments, a "do not allocate" cache hint may be defined and utilized for requests conveyed to the system cache. The requesting agent may generate a "do not allocate" cache hint for a request when the data referenced by the request is likely to be used a single time. Also, a requesting agent may generate a "do not allocate" cache hint if the agent will be storing the data locally.

When the system cache receives a request with a "do not allocate" cache hint, the system cache may prevent a cache line from being allocated for the request if the request hits in the system cache. If the data referenced by the request is already in the system cache, then the system cache may leave the hit cache line in its current state.

A "de-allocate" cache hint may also be generated by a requesting agent and conveyed with a request to the system cache. The "de-allocate" cache hint may also be referred to as the "least recently used" (LRU) cache hint. The "de-allocate" cache hint may be stronger than the "do not allocate" cache hint. In response to receiving a request with a "de-allocate" cache hint, the system cache may be configured to prevent a cache line from being allocated in the system cache if the request is a miss. If the request with the "de-allocate" cache hint is a hit, the system cache may be configured to remove the line from the cache. In one embodiment, the system cache may change the state of the cache line to LRU dirty rather than immediately removing the cache line from the system cache. At a later point in time, when a new cache line needs to be allocated in the system cache, the cache line that was set to a state of "LRU dirty" may be replaced with the new cache line.

An "allocate normal" cache hint may also be generated by a requesting agent and conveyed with a request to the system cache. If the request is a miss, a cache line with a non-sticky state may be allocated in the system cache. A cache line allocated for a request with an "allocate normal" cache hint may not replace a sticky line. However, the cache line may replace another non-sticky cache line. If no non-sticky lines are found, then the request may not allocate. If the request hits in the system cache, then the group ID of the cache line may not be modified and the sticky state of the cache line may also not be modified.

An "allocate sticky" cache hint may also be generated by a requesting agent and conveyed with a request to the system cache. If the request is a miss, a cache line with a sticky state may be allocated in the system cache and may be optionally replaced only by another request with an "allocate sticky" cache hint of the same group ID. A cache line allocated for the request with an "allocate sticky" cache hint may replace a non-sticky cache line for any group ID or may optionally replace a sticky cache line with the same group ID. If the request hits in the cache on a non-sticky cache line, the cache line may remain non-sticky.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 6 illustrates one embodiment of a cache hint table.

DETAILED DESCRIPTION OF EMBODIMENTS

Figure 1:
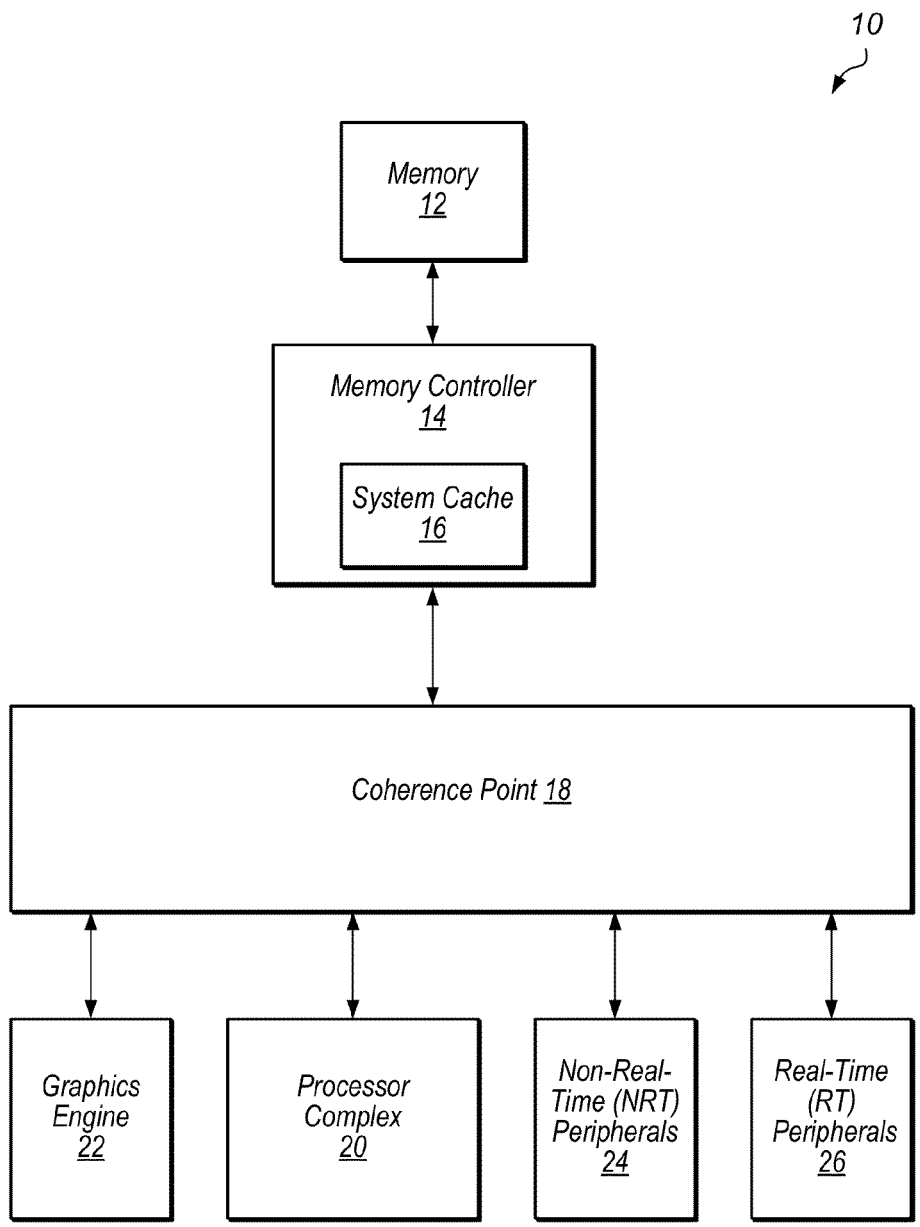
FIG. 1 illustrates one embodiment of a portion of an electronic device.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a cache with a plurality of cache lines, the terms "first" and "second" cache lines can be used to refer to any two of the plurality of cache lines.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an electronic device is shown. In the illustrated embodiment, electronic device 10 includes a memory 12, memory controller 14, coherence point 18, processor complex 20, graphics engine 22, non real-time (NRT) peripherals 24, and real-time (RT) peripherals 26. It is noted that electronic device 10 may also include other components not shown in FIG. 1. Furthermore, in another embodiment, one or more of the components shown in FIG. 1 may be omitted from electronic device 10. In various embodiments, electronic device 10 may also be referred to as an apparatus, mobile device, or computing device.

Memory 12 is representative of any number and type of memory devices, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc.

Memory controller 14 may include circuitry configured to interface to memory 12, and various components may be coupled to memory controller 14 via coherence point 18. In other embodiments, one or more of the other devices shown in FIG. 1 may be coupled directly to memory controller 14 rather than coupled through coherence point 18. In various embodiments, memory controller 14 may include any number of ports for coupling to various peripherals, components, and/or requesting agents.

Memory controller 14 may include system cache 16 for storing data retrieved from or intended for memory 12. System cache 16 may be configured to process memory requests from multiple requesting agents. One or more requesting agents may be included within any of the devices shown connected to coherence point 18. In one embodiment, cache lines may be allocated in system cache 16 with either a sticky state or a non-sticky state. When deciding which data to retain in system cache 16, system cache 16 may base the decisions on the sticky status of the cache lines. For example, in one scenario, geometry data may be provided to processor complex 20, and this geometry data may be translated to a data structure that a 3D engine inside graphics engine 22 can understand. After the translation is performed, the 3D engine may reference the translated data structure multiple times within a single frame. Therefore, the translated data structure may be allocated in system cache 16 as sticky to ensure that the cache lines storing the data structure are not replaced in system cache 16 by other data. As a result of using the sticky allocation for data that is going to be reused, the number of accesses that are made to memory 12 may be reduced, which reduces latency of memory requests and power consumption of electronic device 10.

Coherence point 18 may be configured to route coherent and non-coherent traffic to and from memory controller 14. Coherence point 18 may also be referred to as a coherence switch. Although not shown in FIG. 1, coherence point 18 may be coupled to other devices, such as a flash controller, camera, display, and other devices.

Processor complex 20 may include any number of central processing units (CPUs) (not shown) and various other components (e.g., caches, bus interface unit). The CPU(s) of processor complex 20 may include circuitry to run an operating system (OS). In various embodiments, the OS may be any type of OS (e.g., iOS). Each of the CPUs may include a level one (L1) cache (not shown), and each L1 cache may be coupled to a level two (L2) cache. Other embodiments may include additional levels of cache (e.g., level three (L3) cache).

Graphics engine 22 may include any type of graphics processing circuitry. Generally, the graphics engine 22 may be configured to render objects to be displayed into a frame buffer (not shown). Graphics engine 22 may include graphics processors that execute graphics software to perform a part or all of the graphics operation, and/or hardware acceleration of certain graphics operations. The amount of hardware acceleration and software implementation may vary from embodiment to embodiment. NRT peripherals 24 may include any non-real time peripherals. Various embodiments of the NRT peripherals 24 may include video encoders and decoders, scaler/rotator circuitry, image compression/decompression circuitry, etc. RT peripherals 26 may include any number and type of real-time peripherals.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
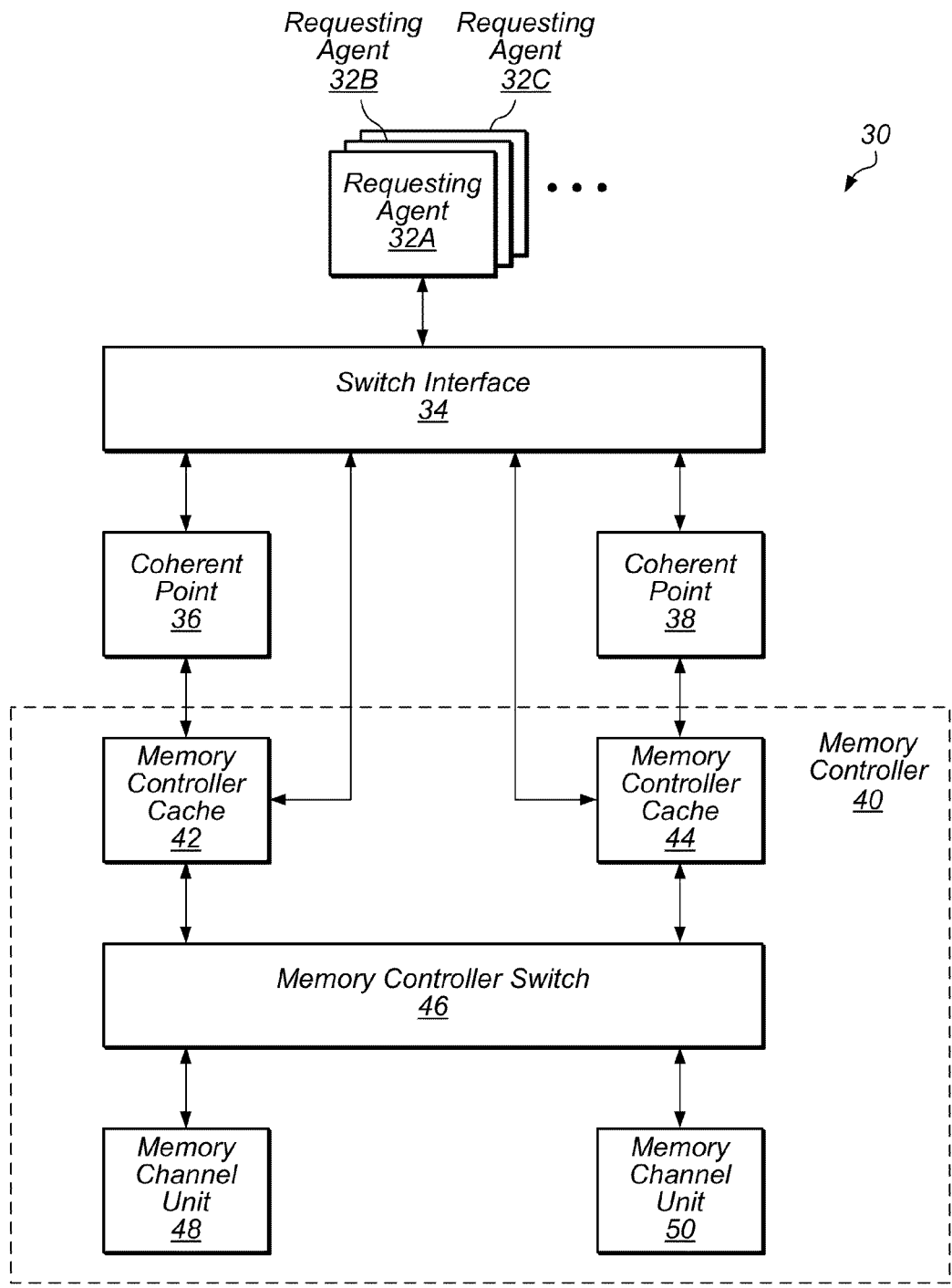
FIG. 2 illustrates one embodiment of a portion of an integrated circuit.

Turning now to FIG. 2, one embodiment of a portion of an integrated circuit is shown. Integrated circuit (IC) 30 may include requesting agents 32A-C, switch interface 34, coherence points 36 and 38, and memory controller 40. Memory controller 40 may include memory controller caches 42 and 44, memory channel switch 46, and memory channel units 48 and 50. Memory controller 40 may be coupled to one or more memory devices (not shown). In various embodiments, IC 30 may be included within any of various types of electronic devices, including mobile, battery-powered devices. IC 30 may also be referred to as a system on chip (SoC). It is noted that IC 30 may include other components and interfaces not shown in FIG. 2.

The requesting agents 32A-C may be configured to perform various operations in the system, and may access memory as part of performing these operations. For example, requesting agents 32 may be processors (either general purpose processors, or special purpose processors such as graphics processors). The processors may be configured to access memory to fetch instructions for execution, and may also be configured to access various data operands of the instructions in memory in response to executing the instructions. Other requesting agents may include fixed function circuitry (e.g., DMA controllers, peripheral interface controllers). The requesting agents 32 may be physically separate circuitry, such as a separate instance of a processor. Alternatively, a requesting agent may be a logical entity such as a process or thread executing on a processor, such that a single physical processor may include multiple logical requestors. The number of requesting agents 32A-C included in a given embodiment may vary, from one to any number of requesting agents.

A given requesting agent (physical or logical) may be identified by a requesting agent identifier (ID). In various embodiments, the requesting agent may add a transaction identifier (TID) to track each individual request separately. Each request generated by a requesting agent 32A-C may be accompanied by a group ID. The group ID may also be referred to as dataset ID. The group ID may be a separate identifier from the requesting agent ID and the TID, and the number of bits used to represent the group ID value may vary depending on the embodiment. For example, in one embodiment, four bits may be used to represent the group ID value, and there may be 16 separate group IDs. The group ID may be assigned to a request based on the dataflow to which the request belongs. The OS or device driver, depending on the embodiment, may assign the group ID. For some types of dataflows, the same group ID may be shared by multiple requesting agent IDs. In one embodiment, requests to page translation tables may be considered part of the same dataflow, and any of these requests, regardless of the requesting agent ID, may be assigned to a common group ID. For other types of dataflows, a group ID may be utilized by only a single requesting agent.

Coherence points 36 and 38 may be configured to manage the coherency of requests that are conveyed to the memory controller 40 from the requesting agents 32A-C. In one embodiment, traffic from requesting agents 32A-C may be split up in switch interface 34 and traverse a specific coherence point depending on the address that is being targeted by the specific memory request. Other embodiments may include other numbers of coherence points.

Memory controller caches 42 and 44 may be separate physical caches but may be considered a single logical memory controller cache. More specifically, memory controller caches 42 and 44 may share a single address space, and memory requests that reference the address space of cache 42 may be routed by switch interface 34 to cache 42 via coherent point 36 and memory requests that reference the address space of cache 44 may be routed by switch interface 34 to cache 44 via coherent point 38. Switch interface 34 may be any type of communication medium (e.g. a bus, a point-to-point interconnect, etc.) and may implement any protocol. An interface may refer to the signal definitions and electrical properties of the interface, and the protocol may be the logical definition of communications on the interface (e.g., including commands, ordering rules, coherence support). It is noted that memory controller caches 42 and 44 may also be referred to as system caches. In other embodiments, memory controller 40 may include other numbers of memory controller caches. For example, in another embodiment, memory controller 40 may include four separate memory controller caches.

Memory controller caches 42 and 44 may be configured to maintain a sticky status for each cache line stored in the caches. The sticky status may be implemented via a sticky state, sticky flag, sticky bit, sticky tag, or other similar field. In one embodiment, a tag memory may be utilized to store tag entries that correspond to cache lines stored in a data memory. The tag entries may include multiple fields including a sticky status field and a group ID field. The group ID field may be used to identify the dataflow source of the request which caused the cache line to be allocated in the cache. In one embodiment, cache lines that are allocated as sticky may be retained until the cache receives a software command to clear the sticky allocation. Each cache 42 and 44 may be configured to implement a replacement policy for existing cache lines, but the replacement policy may exclude the sticky lines from being considered for replacement. A cache line may be allocated as sticky for a request that misses in the cache if the request includes a sticky allocation hint. A requesting agent may make the determination that a specific request should have a sticky allocation hint, and the requesting agent may base the determination on whether the data referenced by the specific request is likely to be used by subsequent requests.

Memory controller switch 46 may route traffic between memory controller caches 42 and 44 and memory channel units 48 and 50. There may be one memory channel unit 48 and 50 for each memory channel included in a given embodiment, and other embodiments may include one channel or more than two channels. The memory channel units 48 and 50 may be configured to schedule memory operations to be transmitted on the memory channel. The memory channel units 48 and 50 may be configured to queue read memory operations (or reads) and write memory operations (or writes) separately, and may be configured to arbitrate between reads and writes using a credit based system, for example. In the credit-based system, reads and writes may be allocated a certain number of credits.

In an embodiment, the memory channel units 48 and 50 may schedule memory operations in bursts of operations. To create bursts of memory operations for scheduling, the memory channel units 48 and 50 may group memory operations into affinity groups. A memory operation may be said to exhibit affinity with another memory operation if the operations may be performed efficiently on the memory interface when performed in close proximity in time.

It should be understood that the distribution of functionality illustrated in FIG. 2 is not the only possible architecture which may be utilized for an integrated circuit. Other integrated circuits may include other components, omit one or more of the components shown, and/or include a different arrangement of functionality among the components.

Figure 3:
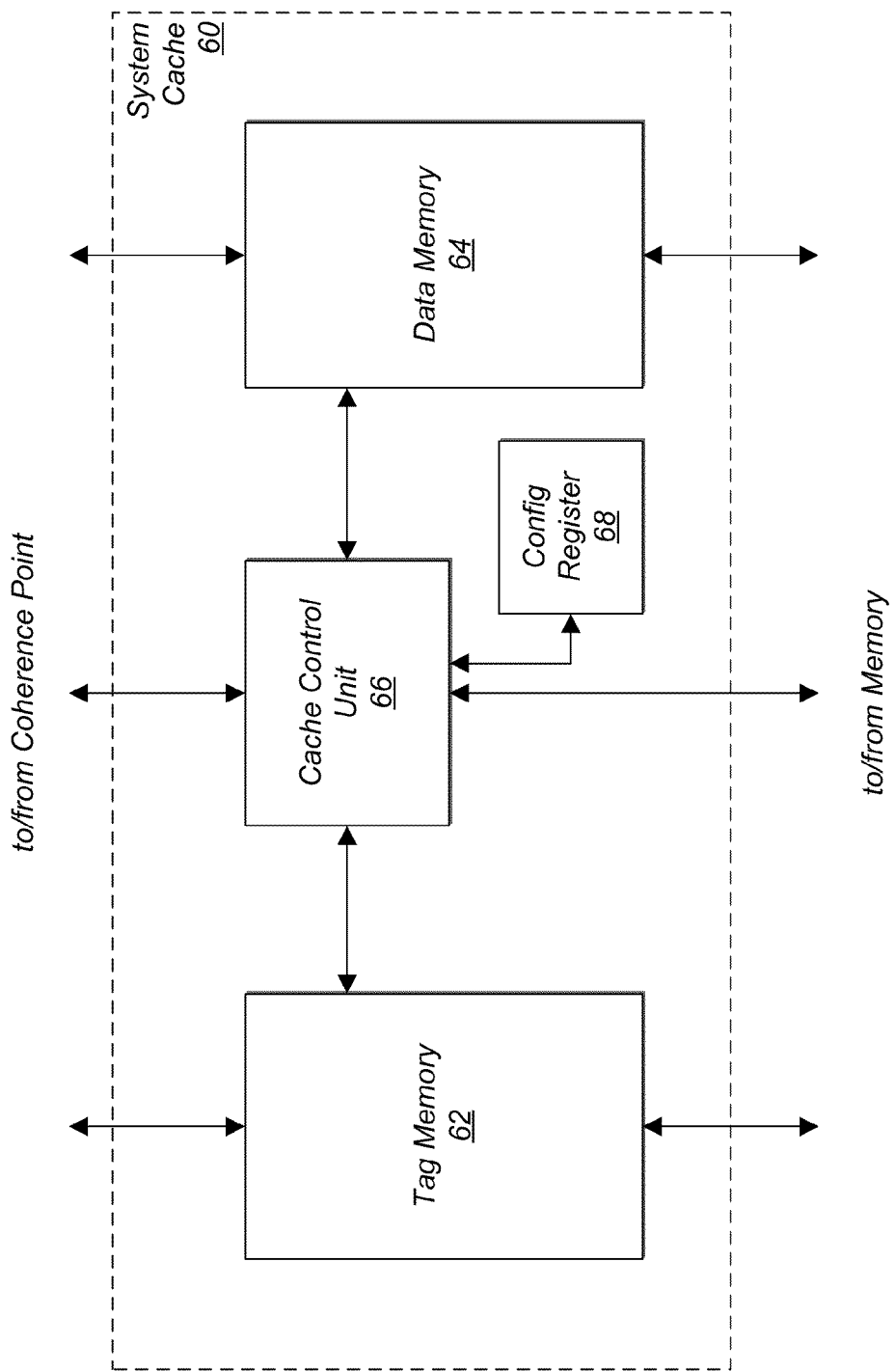
FIG. 3 is a block diagram illustrating one embodiment of a system cache.

Referring now to FIG. 3, a block diagram of one embodiment of a system cache is shown. In one embodiment, system cache 60 may include tag memory 62, data memory 64, cache control unit 66, and configuration register 68. It is noted that system cache 60 may also include other components and logic not shown in FIG. 3. For example, in other embodiments, system cache 60 may include arbitration circuitry to arbitrate among requests. It is to be understood that the system cache architecture shown in FIG. 3 is merely one possible architecture that may be implemented. In other embodiments, other system cache architectures may be utilized with the methods and mechanisms disclosed herein.

In one embodiment, tag memory 62 may be coupled to receive addresses for memory requests from requesting agents. It is noted that the terms "memory request" and "transaction" may be used interchangeably throughout this disclosure. Data memory 64 may be coupled to receive data or provide data for transactions. In various embodiments, tag memory 62 and data memory 64 may include multiple ways, and each way may be addressable by index. For example, in one embodiment, tag memory 62 and data memory 64 may each include 16 ways. In other embodiments, tag memory 62 and data memory 64 may include other numbers of ways. Cache control unit 66 is coupled to tag memory 62 and data memory 64, and cache control unit 66 may be configured to receive various control data related to the received transactions and to respond to the received control data. It is noted that although cache control unit 66 is shown in FIG. 3 as a single unit, in other embodiments, cache control unit 66 may be split up into multiple units within system cache 60. Configuration register 68 may include configuration information for the various group IDs associated with the data stored in system cache 60. Configuration register 68 may be programmed by software commands sent to cache control unit 66 from the OS and/or various requesting agents.

Configuration register 68 is representative of any number of configuration registers which may be utilized as part of system cache 60. For example, in one embodiment, there may be a separate configuration register 68 for each group identifier (ID) assigned by the OS to use system cache 60. In this embodiment, each configuration register may define a status, quota, and clearance policy for a respective group ID. The status may be set to either active or inactive by a software command sent to system cache 60. When the status is set to inactive, this may trigger the cache control unit 66 to invalidate all of the lines that are allocated for this particular group ID. The quota may be set to limit the amount of lines that may be allocated for the respective group ID in system cache 60. In one embodiment, there may be a quota counter (not shown) for each group ID in the cache control unit 66. The quota counter may keep track of the number of cache lines in system cache 60 for the corresponding group ID. The replacement policy may specify if the given group ID can replace its own sticky lines with new sticky lines. In one embodiment, this replacement policy may be indicated using a sticky replacement configuration option indicator. This replacement policy may only be carried out if there are no available non-sticky cache line storage locations in system cache 60 for the new sticky line.

Data memory 64 may comprise a set of data entries, each having capacity to store a cache line of data. The cache line may be the unit of allocation and deallocation in data memory 64. The cache line may be any desirable size, such as 32 bytes or 64 bytes, although larger and smaller cache line sizes may be supported in other embodiments. In another embodiment, the cache lines of data memory 64 may be referred to as "cache blocks".

In various embodiments, data memory 64 may utilize any type of memory device. In one embodiment, data memory 64 may comprise a RAM, for example, indexed by entry number. Data memory 64 may be arranged so that a set of cache line storage locations may be selected for read/write operation responsive to an index portion of the input address (e.g., a number of bits of the address that may be decoded to uniquely select a set among the number of implemented sets). The cache line storage location that is to be accessed may be identified by the cache control unit 66 (e.g., responsive to detecting a cache hit for a request, responsive to allocating the cache line storage location to store a missing cache line). Data may be read from the accessed cache line storage location to return to the requestor for a read cache hit, or to transmit to the memory for a cache line evicted from system cache 60. Data may be written to the accessed cache line storage location for a write cache hit from a requestor or to complete a cache fill of a missing cache line into an allocated cache line storage location. In some embodiments, data memory 64 may be a banked implementation and bank selection control may be provided from the cache control unit 66 as well.

Tag memory 62 may utilize any type of memory device, such as for instance, a RAM. Alternatively, tag memory 62 may comprise a content addressable memory (CAM) for snooping purposes, or a RAM/CAM combination. The tag memory 62 may comprise a plurality of tag entries, each entry selected by a different value of the index mentioned above.

The selected tag entry may store the tags that correspond to the set of cache line storage locations in system cache 60 that are selected by the index. Each tag corresponds to a cache line in the respective cache line storage location, and may include the tag portion of the address of the corresponding cache line (i.e., the address, less the least significant bits that define an offset within the cache line and the bits that are used for the index), and various other state information. In response to a request, the tag memory 62 may be configured to decode the index and output the tags to the cache control unit 66 for processing. In an embodiment, the tag memory 62 may also include tag comparison circuitry configured to compare the tags to the tag portion of the request address, and may provide the comparison results to the cache control unit 66. In another embodiment, the cache control unit 66 may compare the tags. The cache control unit 66 may also be configured to perform various tag updates by writing the tag entry.

System cache 60 may have any configuration. In some embodiments, a direct mapped or set associative configuration may be implemented. In typical direct mapped and set associative caches, there is a preconfigured, one-to-one correspondence between tag entries and data entries. In a direct mapped configuration, each address maps to one possible entry (tag memory 62 and data memory 64) in system cache 60, at which the corresponding cache line would be stored. In one embodiment, system cache 60 may be associative, in which a given address maps to two or more cache line storage locations in the data memory 64 that may be eligible to store the cache line. System cache 60 may be set associative, in which each address maps to two or more possible entries (dependent on the associativity of the cache). In one embodiment, N cache line storage locations are mapped to addresses having the same value in a subset of the address bits referred to as an index, where N is an integer greater than one and less than the total number of cache line storage locations in data memory 64. The N cache line storage locations forming a set corresponding to a given index are often referred to as "ways". Other embodiments may be fully associative, in which any cache line storage location may be mapped to any address.

Cache control unit 66 may dynamically allocate a data entry in data memory 64 to store data for a transaction received by system cache 60. The transaction may be a write to memory, for example. The transaction may also be a read completion (with data) provided from the memory (not shown) in response to a read previously received from a requesting agent and targeting the memory.

In one embodiment, each transaction received by system cache 60 from a requesting agent may include a group ID number, a cache allocation hint, and one or more other attributes. The cache allocation hint may be utilized by system cache 60 and cache control unit 66 to determine how to allocate a cache line for the transaction if the transaction misses in the system cache 60. If a new cache line is allocated for the transaction, the group ID number may be stored in a corresponding entry in tag memory 62.

In one embodiment, cache control unit 66 may determine if there is an available entry in data memory 64 in response to receiving a sticky transaction from a requesting agent. If the transaction is sticky and a cache miss, and there is an available non-sticky entry in data memory 64, then a new sticky entry may be allocated for the transaction, replacing the available non-sticky entry. If the transaction is sticky and a cache hit to a non-sticky entry, the non-sticky entry may not be converted to sticky by this hit. In another scenario, if a non-sticky transaction hits on a sticky entry, then the sticky entry may remain sticky.

Tag memory 62 may be configured to store various tags for the cache lines cached in the system cache 60. For example, in one embodiment, the tags may include the coherence state, the sticky state, a dirty indicator, least recently used (LRU) data, a group identification (ID), and other data. Depending on the embodiment, some or all of these tags may be included in each entry of tag memory 62.

In one embodiment, a cache line may be initially allocated for a non-sticky transaction by a particular requesting agent. The particular requesting agent for which the cache line was initially allocated may be considered the primary user of that line. Any subsequent hits by other group IDs to this entry may be considered secondary users, and therefore, the original non-sticky state may be maintained for the cache line, even if subsequent hits for the cache line are for sticky transactions.

In one embodiment, a cache line with a sticky state allocated for a first group ID may be hit by a sticky transaction for a second group ID. In this scenario, the group ID of the tag entry corresponding to the cache line may be changed to the second group ID. In other words, the second group ID may inherit the cache line from the first group ID. This mechanism for inheriting cache lines may be useful in certain graphics processing applications, when data for a previous frame may be used again for the next frame. To facilitate the reuse of this data, the ownership of the cache line may be transferred from the first group ID to the second group ID.

In some embodiments, ownership of cache lines may be transferred from a first group ID to a second group ID via a software command sent to cache control unit 66. The software command may specify that all cache lines that are assigned to the first group ID be transferred to the second group ID. This feature may prove beneficial in many applications, including graphics applications.

Figure 4:
FIG. 4 is a block diagram illustrating one embodiment of a pair of tag memory ways.

Turning now to FIG. 4, a block diagram of one embodiment of a pair of tag memory ways is shown. Tag memory ways 70A-B are representative of any number of ways that may be included within a tag memory, such as tag memory 62 (of FIG. 3). In one embodiment, each tag memory way 70A-B may include any number of entries for data corresponding to cache lines stored in a corresponding data memory way. A sample entry is shown in each of tag memory ways 70A-B.

Each tag entry may include the tag portion of the address (tag address 72A-B), to be compared against input request addresses. Tag address 72A-B may include the most significant bits of the physical address field for a received transaction. The number of bits used for the tag address 72 field may vary depending on the embodiment. State 74A-B may represent the state of the corresponding cache line stored in the data memory. There may be multiple different values which the state 74A-B may take, depending on the embodiment. For example, in one embodiment, the different possible states may include the following: invalid, clean, dirty, data pending, sticky clean, sticky dirty, and LRU dirty. The clean/dirty status of a cache line may be conveyed along with the transaction to the system cache by the requesting agent. The requesting agent may also provide a hint as to the sticky status of the transaction. The data pending state may indicate that data for the cache line is currently being fetched from memory. Any entries with an invalid state may be chosen as the best candidates for replacement when a new line is allocated in the system cache. The next best candidates for replacement may be any entries with the LRU dirty state. It is noted that in another embodiment, each entry in tag memory ways 70A-B may include a sticky flag or sticky bit, and this may indicate if the entry is sticky, rather than the state field.

The requesting agent responsible for generating the transaction may convey a hint with the transaction that determines the state that will be assigned to the corresponding tag entry. This hint may determine if the data associated with the transaction is stored in the system cache. For example, in one scenario, for a specific transaction, the hint accompanying the transaction may indicate that the transaction is sticky. If the transaction is accompanied by a sticky hint, and the transaction misses in the system cache, then the data may be retrieved from memory and allocated in the system cache with a tag state 74 set to sticky. Setting the state to sticky indicates that this data will "stick" in the cache and will not be removed by the system cache. If data for another sticky transaction from a different group ID were attempting to allocate space in the system cache, this data would be prevented from replacing sticky lines from other group IDs.

In one embodiment, the only way to remove sticky data is for the system cache to receive a software command indicating that certain sticky data for a specific group ID may be removed. In another embodiment, sticky data for a first group ID may be removed from the system cache by other sticky data from the first group ID based on the settings of a corresponding configuration register. If the setting in the configuration register for a specific group ID indicates that this group ID may replace sticky lines with other sticky lines, then a sticky line may be replaced by another sticky line for this group ID.

In some embodiments, ownership of sticky lines may be transferred from one group ID to another group ID. This transfer of ownership may be utilized in various scenarios in which data may be initially used by a first group ID and then later by a second group ID. For example, in a graphics application, certain data may be used to build one frame. A first agent using a first group ID may initially allocate data for this graphics frame. Then, a second agent using a second group ID may reuse the data for the next frame of the graphics application. The software may generate a request to transfer ownership of the frame data from the first group ID to the second group ID. The system cache may receive this software request and as a result may pass ownership from the first group to the second group while keeping the data as sticky. Also, textures that are used in a current phase of a three-dimensional (3D) graphics application may be reused for the next phase. There may be an overlap between the 3D phases, like certain boundary tiles, and these tiles may be transferred between group IDs for consecutive phases. It is noted that the transfer of ownership of cache lines between group IDs may also occur in a variety of other applications besides just graphics applications.

Allocating a line in the system cache with a sticky state will result in the line being retained in the system cache even if the amount of time in between accesses to the sticky line is large. For example, certain data may be accessed frequently, but there may be a long duration of time between accesses. This data may be placed in the system cache with the state 74 set to sticky. Therefore, the data will remain in the system cache regardless of how long the duration of time is between accesses. For example, a first cache line may be allocated as sticky in the system cache, and a length of time may elapse such that all other lines in the cache may either be replaced or accessed at least once prior to the first cache line being accessed again. If a new line needs to be allocated in the cache, the new line will take the place of one of the non-sticky lines in the cache, even if the non-sticky line has been accessed more recently than the first cache line. The first cache line may remain in the cache even if it is the least recently accessed line in the cache. This is in contrast with a traditional cache, where most recently accessed lines are retained in the cache, and the lines that have not been accessed for a long period of time are replaced.

The LRU 76A-B field may store a value indicating a usage status associated with the corresponding line. This LRU 76A-B field may indicate how recently and/or how often the corresponding line has been accessed, and the number of bits in this field may vary depending on the embodiment. The group ID 78A-B field may store a group ID identifying the group that owns the corresponding line in the data memory of the system cache. The group may refer to a specific dataflow that is being used by one or more requesting agents. It is noted that a "group ID" may also be referred to as a "dataset ID" in some embodiments. Depending on the embodiment, various numbers of bits may be utilized to represent the group ID.

In some cases, a single group ID may be shared by two or more requesting agents. For example, page translation tables may be utilized by multiple requesting agents, and any transactions referencing the page translation tables may be assigned a common group ID. This common group ID may span multiple requesting agents. Also, each requesting agent may use multiple separate group IDs for the different dataflows being utilized by the requesting agent. A group ID may be assigned to a dataflow for one or more requesting agents by the OS of the host electronic device. In one embodiment, a device driver may request a group ID from the OS. As part of the request, the device driver may identify which type of data the request corresponds to. Then, in response to receiving the request from the device driver, the OS may specify the group ID to be used for this request based on the type of data being accessed.

Each group represented by a group ID may be assigned a specific quota of cache lines in the system cache. When a group reaches the total amount of its quota, the group may not be able to allocate any more lines in the system cache. Instead, the specific group may replace its existing lines in the cache with the newly allocated lines. In one embodiment, the first lines that are replaced for a given group ID may be the lines which have an invalid state followed by the lines which have a LRU dirty state.

The parity 80A-B field may include any number of parity bits to provide an indication of the accuracy of the data in the entire entry across all of the fields. It is noted that in other embodiments, each entry of tag memory ways 70A-B may include one or more additional fields of information not shown in FIG. 4. For example, information about how recently the cache line was replaced may also be stored in each tag of tag memory ways 70A-B. Also, in other embodiments, tag memory ways 70A-B may be structured in any other suitable manner.

Figure 5:
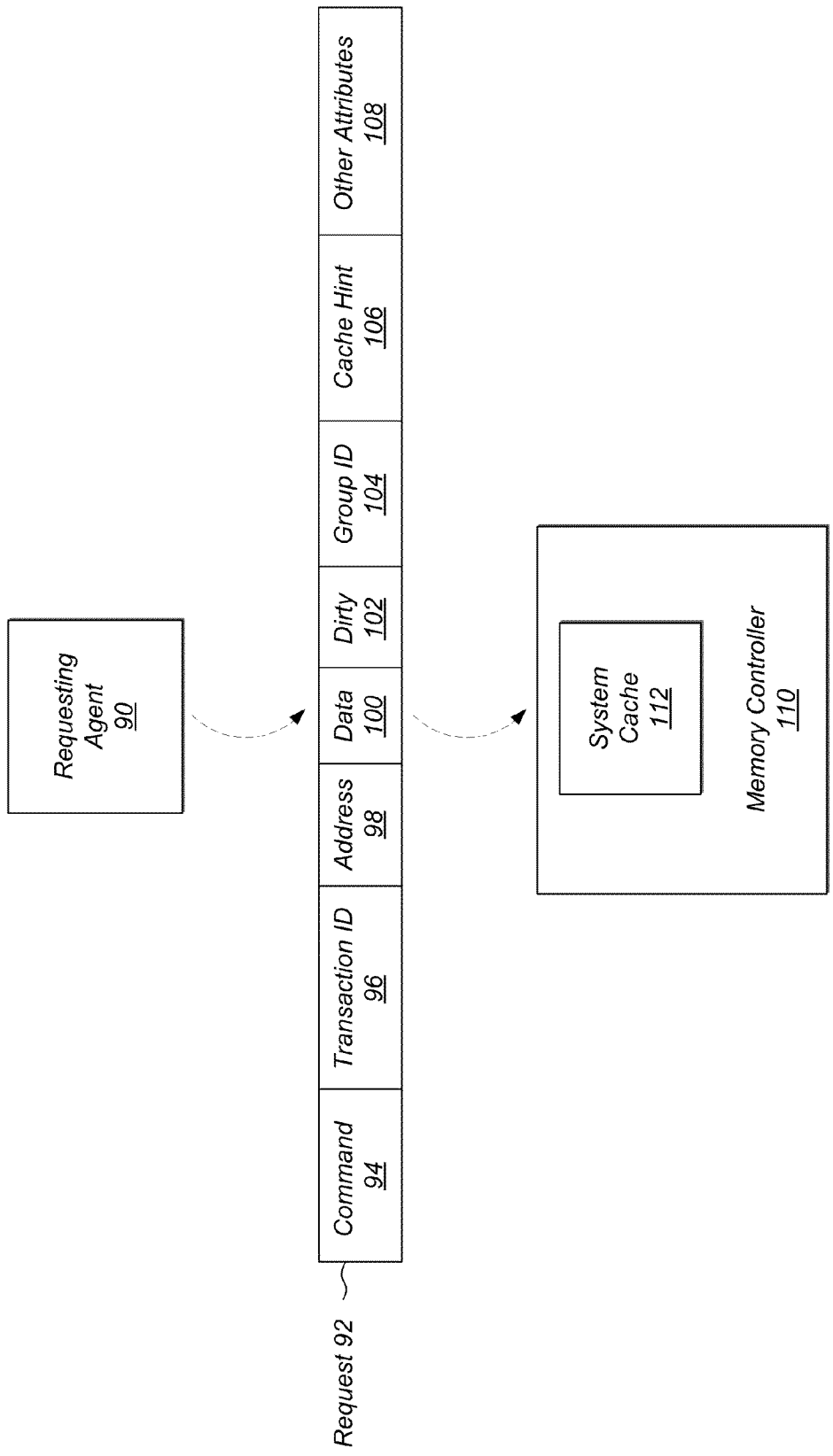
FIG. 5 illustrates one embodiment of a requesting agent conveying a request to a system cache.

Referring now to FIG. 5, one embodiment of a requesting agent conveying a request to a system cache is shown. Requesting agent 90 is representative of any number and type of requesting agents. Although requesting agent 90 is shown as sending request 92 directly to memory controller 110, it is noted that one or more components (e.g., coherent point, switch) may be located between requesting agent 90 and memory controller 110.

Each request sent from requesting agent 90 may include a plurality of fields. For example, in one embodiment, request 92 may include command 94, which indicates the type of request (e.g., read, write) being sent. Request 92 may also include transaction ID 96, which indicates the transaction ID associated with request 92. Transaction ID 96 may uniquely identify the request for requesting agent 90. It is noted that transaction ID 96 may also be referred to as a "request ID". In addition, in other embodiments, request 92 may also include an agent ID to identify the requesting agent. Request 92 may also include the address 98 and data 100 fields to identify the memory address and data (for a write request), respectively.

Request 92 may also include a dirty status indicator 102 to indicate if the write data is dirty. Request 92 may also include a group ID 104 to identify the group ID of request 92. Cache hint 106 may determine how request 92 is treated by system cache 112. In other embodiments, cache hint 106 may be referred to as an "allocation hint", "sticky hint", "sticky flag", "sticky bit", or "sticky attribute". It is noted that cache hint 106 may indicate the sticky status of request 92 and may also include other information regarding how request 92 should be treated by system cache 112. Other attributes 108 are representative of any number and type of additional attributes (e.g., coherency, QoS, size of the request, requestor ID) which may be part of request 92. It is noted that in other embodiments, request 92 may be structured differently, with one or more additional fields not shown in FIG. 5 and/or one or more of the fields shown omitted.

Although system cache 112 is shown as a single unit, it should be understood that in other embodiments, system cache 112 may be split up into two or more separate units. For example, in another embodiment, memory controller 110 may include two channels and system cache 112 may be split up into two separate physical system caches.

In this embodiment, the two separate physical system caches may be managed as one logical system cache.

Turning now to FIG. 6, one embodiment of a cache hint table is shown. Cache hint table 114 is one example of a cache hint table for specifying the values that may be assigned to various cache hints. Other embodiments may have other types of cache hints and/or may assign other values to the cache hints. In other embodiments, the values assigned to cache hints may have more than or fewer than three bits. For example, if there are only four or fewer cache hints, then two-bit values may be used.

The cache hint may be assigned to a request by the requesting agent that generates the request. A requesting agent may determine which cache hint to use based on the type of data being referenced by the request. In some embodiments, if the data is likely to be reused, the requesting agent may assign a cache hint to the request which will cause the request to be allocated and maintained in the cache. If the data is only going to be used a single time, or if the requesting agent will be taking ownership of the data, then the requesting agent may assign a cache hint which will prevent the request from being allocated in the cache.

As shown in table 114, a cache hint of "no hint" may be assigned a value of "000". When a "no hint" value is received with a given request by a system cache, the system cache may determine how to process the given request based on the programming in a global configuration register. For example, in one embodiment, the configuration register may specify treating "no hint" requests as "allocate normal", and so the system cache may process the given request as if the request included an "allocate normal" cache hint. Also, the group ID of the request may be ignored for "no hint" requests and the group ID may be set to all 0's. In other embodiments, the system cache may choose alternate methods for responding to "no hint" requests.

A cache hint of "allocate normal" may be specified with a value of "001" in the cache hint field of the request. For "allocate normal" requests, cache lines may be allocated in the system cache and may be replaced by other lines using a LRU scheme. An "allocate normal" request may replace other non-sticky lines. However, if there are no available non-sticky cache line candidates in the system cache, then the request may not allocate in the system cache.

A cache hint of "allocate sticky" for a request may be specified with a value of "010" in the cache hint field of the request. For "allocate sticky" requests, cache lines may be allocated in the cache as sticky and may be optionally replaced only by other "allocate sticky" requests of the same group ID. A cache hint of "do not allocate" for a request may be specified with a value of "011". For "do not allocate" requests, cache lines may not be allocated in the cache. If a "do not allocate" request hits in the cache, then the hit cache line may be left in the cache and may maintain its current state.

A cache hint of "de-allocate", or "set LRU", for a request may be specified with a value of "100" in the cache hint field of the request. For "de-allocate" requests, cache lines may not be allocated in the system cache. If a "de-allocate" request hits in the system cache, then the state of the hit cache line may be updated to "LRU dirty". Then, the system cache may replace this cache line at some future point when a subsequent request misses in the system cache.

If a "de-allocate" request is a read hit, then the local copy may be invalidated if it is clean or the local copy may be marked as a prime candidate for replacement (e.g., LRU dirty) if it is dirty. If the cache line is dirty and the request is a coherent read request then the ownership of the dirty data may be transferred to the requesting agent and the system cache may invalidate the local copy. The other cache hint values (101, 110, and 111) may be reserved for other types of hints. For example, in other embodiments, other hints (e.g., "drop") may be defined and used by requesting agents and the system cache.

The system cache may include configuration options to determine whether to follow or ignore the cache hints. In one embodiment, a configuration register may be utilized to enable or disable cache hint processing. In some embodiments, there may be a separate configuration register for each group ID. Another global configuration register may be utilized to define a generic allocation policy if a requesting agent does not specify a cache hint. In one embodiment, the system cache may only comply with the cache hint if a group ID is specified as part of the request. If the request does not have a group ID, then the cache hint may be ignored.

Figure 7:
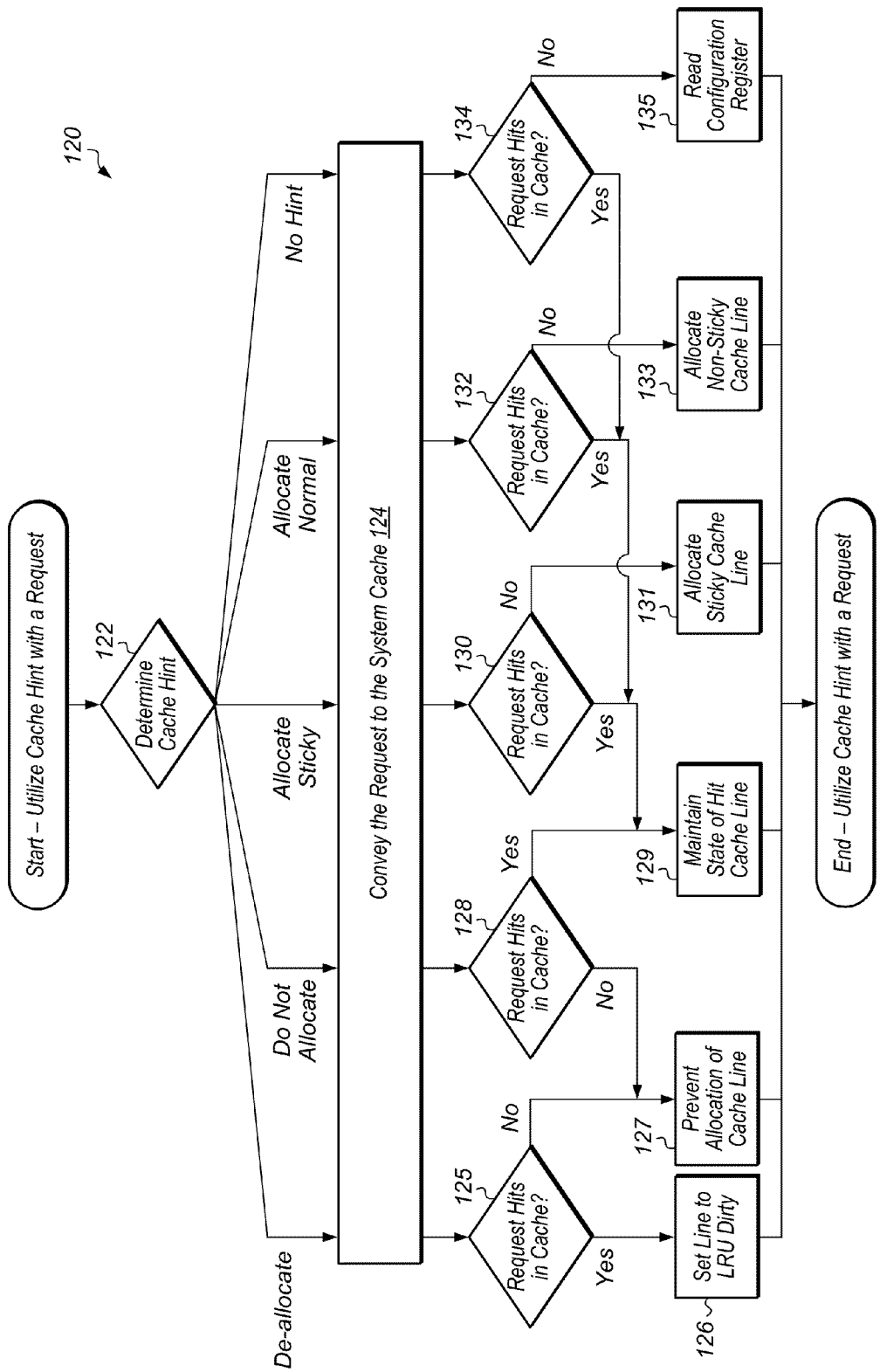
FIG. 7 is a generalized flow diagram illustrating one embodiment of a method for utilizing a cache hint with a memory access request.

Referring now to FIG. 7, one embodiment of a method 120 for utilizing cache hints is shown. For purposes of discussion, the steps in this embodiment are shown in sequential order. It should be noted that in various embodiments of the method described below, one or more of the elements described may be performed concurrently, in a. different order than shown, or may be omitted entirely. Other additional elements may also be performed as desired.

In one embodiment, a requesting agent may determine which cache hint to generate and include with a memory access request (conditional block 122). In various embodiments, the requesting agent may be a CPU, graphics engine, L2 cache, or any of various other requesting agents. The choice of which allocation hint to use for a request may depend on one or more of a variety of factors. For example, whether the data is likely to be reused may be the determining factor for many requests. Also, there may be a plurality of different types of cache hints to choose from when the requesting agent generates a request.

In one scenario, the requesting agent may generate a de-allocate cache hint for the request (conditional block 122, "de-allocate" leg) when the data referenced by the request is likely only going to be used a single time or if the requesting agent is taking ownership of the data. Similarly, if the data referenced by the request is likely only going to be used a single time, then the requesting agent may generate a do not allocate cache hint for the request (conditional block 122, "do not allocate" leg). The choice of "do not allocate" may be made if there is a slightly greater likelihood of the data referenced by the request being reused versus requests that get assigned a "de-allocate" cache hint. Alternatively, "do not allocate" may be used if the requesting agent can predict that another agent may reuse the same data referenced by the request. Therefore, "do not allocate" cache hint would not result in the data being replaced in the cache if the data has been allocated sticky by another requesting agent.

If the requesting agent can guarantee (or predict with a high degree of certainty) that the data referenced by the request will be reused, then the requesting agent may assign a sticky cache hint to the request (conditional block 122, "allocate sticky" leg). If the requesting agent determines that the data referenced by the request has a moderate likelihood of being reused, then the requesting agent may assign a sticky cache hint to the request (conditional block 122, "allocate normal" leg). If the requesting agent is not configured to generate a hint, or if the requesting agent has inadequate knowledge regarding the data referenced by the request, then the requesting agent may not assign a hint to the request (conditional block 122, "no hint" leg).

After the requesting agent has generated the appropriate cache hint for the request, the requesting agent may convey the request to the system cache (block 124). The request may include the cache hint, a group ID, and one or more other attributes. Then, the system cache may detect a hit or miss for the request. If the request with the de-allocate cache hint hits in the system cache (conditional block 125, "hit" leg), then the state of the hit cache line may be set to "LRU dirty" (block 126). By setting the hit cache line to "LRU dirty", the cache line may be considered a good candidate for replacement by the system cache the next time a new cache line needs to be allocated. In other words, setting the hit cache line to "LRU dirty" may cause the hit cache line to be de-allocated from the system cache, though the actual replacement of the hit cache line may occur at some later point in time. If the request with the de-allocate cache hint misses in the system cache (conditional block 125, "miss" leg), then the system cache may be prevented from allocating a cache line for the request (block 127). Instead, the request may be conveyed to memory and the data referenced by the request may not be stored in the system cache.

If the request with the do not allocate cache hint hits in the system cache (conditional block 128, "hit" leg), then the state of the hit cache line may be maintained in its current state (block 129). If the request with the do not allocate cache hint misses in the system cache (conditional block 128, "miss" leg), then the system cache may be prevented from allocating a cache line for the request (block 127).

If the request with the allocate sticky cache hint hits in the system cache (conditional block 130, "hit" leg), then the state of the hit cache line may be maintained in its current state (block 129). Alternatively, in some embodiments, if the state of the hit cache line is LRU dirty, then the state may be updated to sticky dirty. If the request with the allocate sticky cache hint misses in the system cache (conditional block 130, "miss" leg), then the system cache may allocate a sticky cache line for the request if an available candidate for replacement exists (block 131).

If the request with the allocate normal cache hint hits in the system cache (conditional block 132, "hit" leg), then the state of the hit cache line may be maintained in its current state (block 129). If the request with the allocate normal cache hint misses in the system cache (conditional block 132, "miss" leg), then the system cache may allocate a non-sticky cache line for the request if an available candidate for replacement exists (block 133). A sticky cache line may not be replaced by the cache line allocated for the "allocate normal" cache hint request. If there are no non-sticky cache lines available in the system cache, then the request may not allocate in the system cache.

If the request with no cache hint hits in the system cache (conditional block 134, "hit" leg), then the state of the hit cache line may be maintained in its current state (block 129). If the request with no cache hint misses in the system cache (conditional block 134, "miss" leg), then the system cache may read the configuration register to determine how to respond to the request (block 135). For example, in one embodiment, if the configuration register indicates that "no hint" requests should be treated the same as "allocate normal" requests, the system cache may allocate a non-sticky cache line for the request if an available candidate for replacement exists (block 133).

After blocks 126, 127, 129, 131, and 133, method 120 may end. While method 120 is described as being implemented for a single request, it is noted that method 120 may be performed concurrently for any number of requests. In other words, the steps of method 120 may be performed in parallel for multiple requests.

Figure 8:
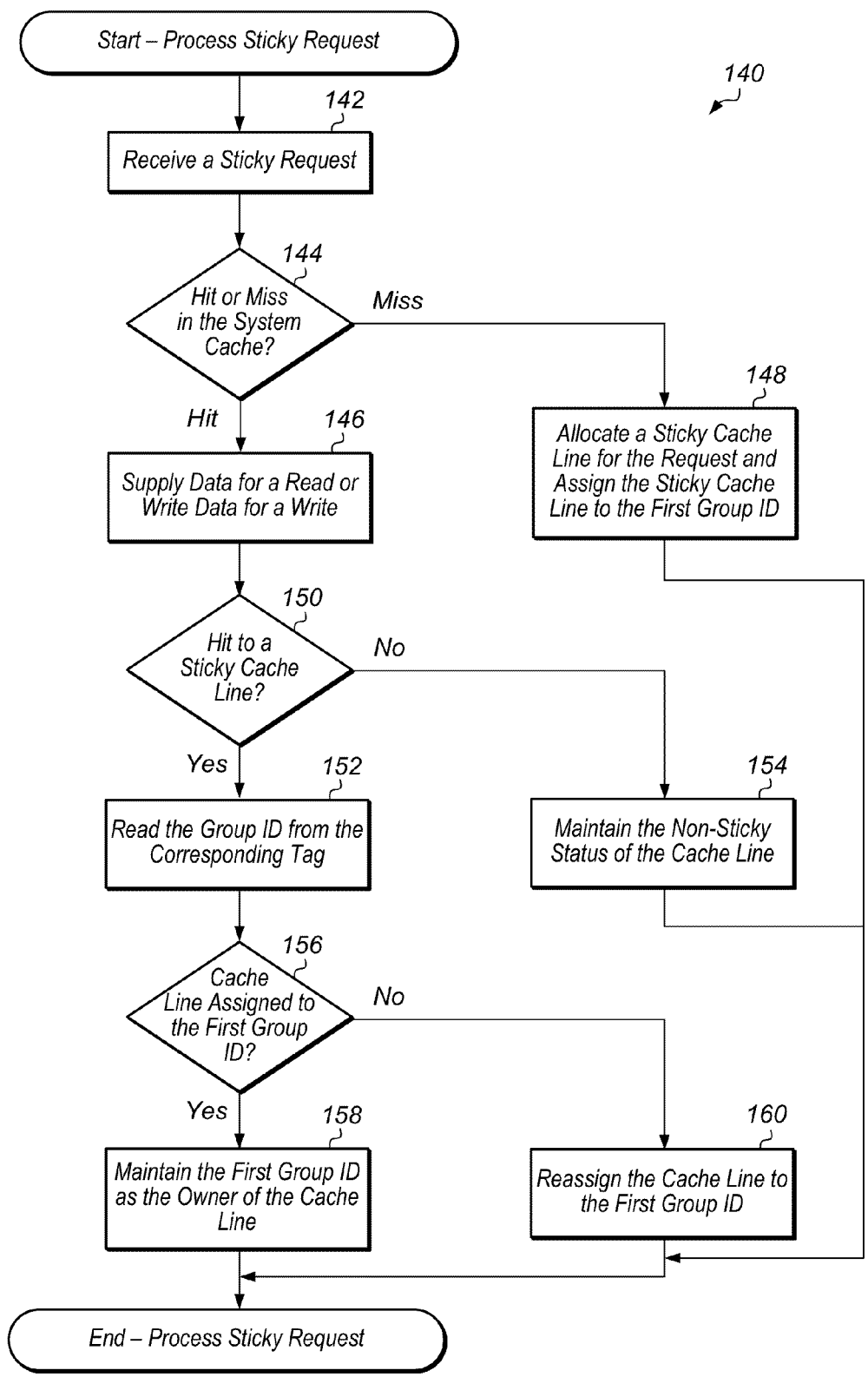
FIG. 8 is a generalized flow diagram illustrating one embodiment of a method implemented by a system cache for processing a request with a sticky allocation hint.

Referring now to FIG. 8, one embodiment of a method 140 implemented by a system cache for processing a request with a sticky allocation hint is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A request with a sticky allocation hint (i.e., "sticky request") may be received by a system cache (block 142). For the purposes of this discussion, the sticky request is assumed to be assigned to a first group ID. In one embodiment, the sticky request may include a plurality of tags, including a tag identifying the first group ID as the owner of the request. The cache control unit of the system cache may be configured to detect a cache hit or miss for the sticky request (conditional block 144). Generally, a request may be a hit in the system cache if the addressed cache line is stored in the system cache at the time of the request, and a miss if the addressed cache line is not stored in the system cache at the time of the request.

If the sticky request is a hit (conditional block 144, "hit" leg), the data memory may be configured to supply data for a read, or data may be written into the data memory for a write (block 146). If the sticky request is a miss (conditional block 144, "miss" leg), then a sticky cache line may be allocated in the cache for the sticky request and assign the sticky cache line to the first group ID (block 148). The cache control unit may utilize any of a variety of replacement strategies for finding a cache line storage location for allocating the sticky cache line. In one embodiment, the cache control unit may attempt to use a non-sticky cache line storage location for allocating the sticky cache line. After block 148, method 140 may end.

If the hit is to a cache line with a sticky state attribute (conditional block 150, "yes" leg), then the cache control unit may read the group ID from the corresponding tag in the tag memory (block 152). It is noted that block 150 may be performed concurrently with block 146. Alternatively, block 150 may be performed prior to block 146. If the hit is to a cache line with a non-sticky state attribute (conditional block 150, "no" leg), then the cache control unit may maintain the non-sticky status of the cache line (block 154). After block 154, method 140 may end.

If the hit cache line is assigned to the first group ID (conditional block 156, "yes" leg), then the tag memory may maintain the first group ID as the owner of the cache line (block 158). If the hit cache line is assigned to another group ID (conditional block 156, "no" leg), then the tag associated with the cache line may be updated and reassigned to the first group ID (block 160). In this way, the ownership of the cache line may be transferred from its previous group ID to the first group ID. After block 158 or block 160, method 140 may end.

The flowchart of FIG. 8 illustrates operation of a system cache in response to receiving a sticky request. It is noted that the system cache may be configured to operate on multiple requests in parallel. Additionally or alternatively, operations illustrated in FIG. 8 may be pipelined, and thus the system cache may have multiple requests at different points in the processing.

Figure 9:
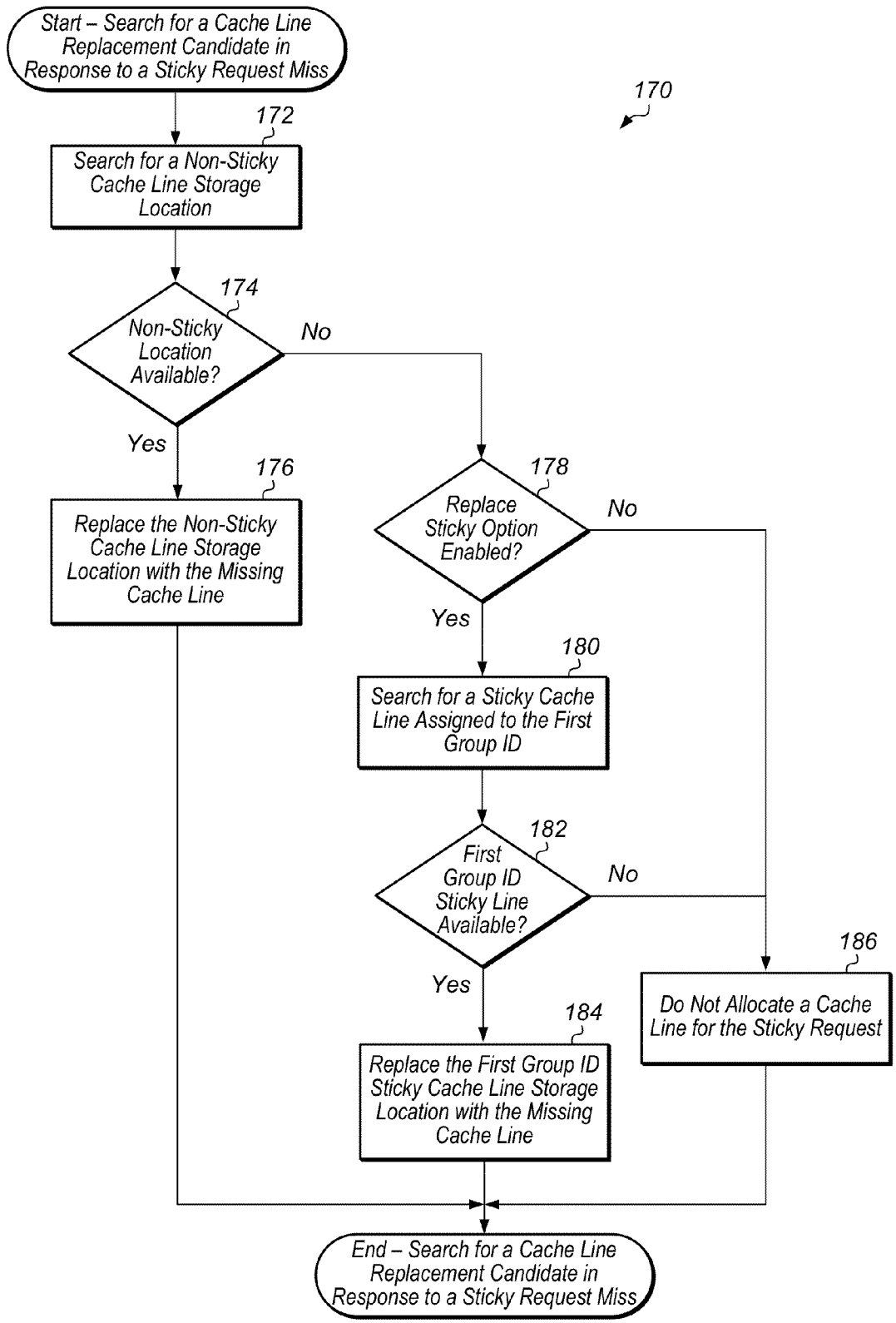
FIG. 9 is a generalized flow diagram illustrating one embodiment of a method for searching for a cache line replacement candidate in response to a sticky request miss.

Turning now to FIG. 9, one embodiment of a method 170 for searching for a cache line replacement candidate in response to a sticky request miss is shown. In some embodiments, method 170 of FIG. 9 may correspond to block 148 of method 140 of FIG. 8. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

The system cache may search for a non-sticky cache line storage location in response to detecting a miss for a sticky request (block 172). For the purposes of this discussion, the sticky request is assumed to be assigned to a first group ID. It is noted that the system cache may search for non-sticky cache line storage locations periodically and may have located one or more storage locations ready to be replaced prior to a miss being detected for a received request. If there is a non-sticky cache line storage location available (conditional block 174, "yes" leg), the system cache may replace the non-sticky cache line storage location with the missing cache line corresponding to the sticky request (block 176). If a non-sticky cache line storage location is not available (conditional block 174, "no" leg), then the cache control unit may query the configuration register for the first group ID to determine if the sticky replacement configuration option is enabled for the first group ID (conditional block 178).

If the sticky replacement configuration is enabled for the first group ID (conditional block 178, "yes" leg), then the system cache may search for a sticky cache line assigned to the first group ID (block 180). If the sticky replacement configuration is disabled for the first group ID (conditional block 178, "no" leg), then the system cache may not allocate a cache line for the sticky request (block 186). Data may be retrieved from memory for the sticky request and returned to the requesting agent responsible for the sticky request, and this data may not be stored in the system cache.

If there is a sticky cache line in the system cache that is assigned to the first group ID (conditional block 182, "yes" leg), then the system cache may replace the sticky cache line storage location with the missing cache line corresponding to the sticky request (block 184). If there is not a sticky cache line in the system cache that is assigned to the first group ID (conditional block 182, "no" leg), then the system cache may not allocate a cache line for the sticky request (block 186). After blocks 176, 184, and 186, method 170 may end.

The flowchart of FIG. 9 illustrates operation of a system cache in response to detecting a miss for a sticky request. It is noted that the system cache may be configured to operate on multiple sticky request misses in parallel. Additionally or alternatively, operations illustrated in FIG. 9 may be pipelined, and thus the system cache may have multiple sticky request misses at different points in the processing.

Figure 10:
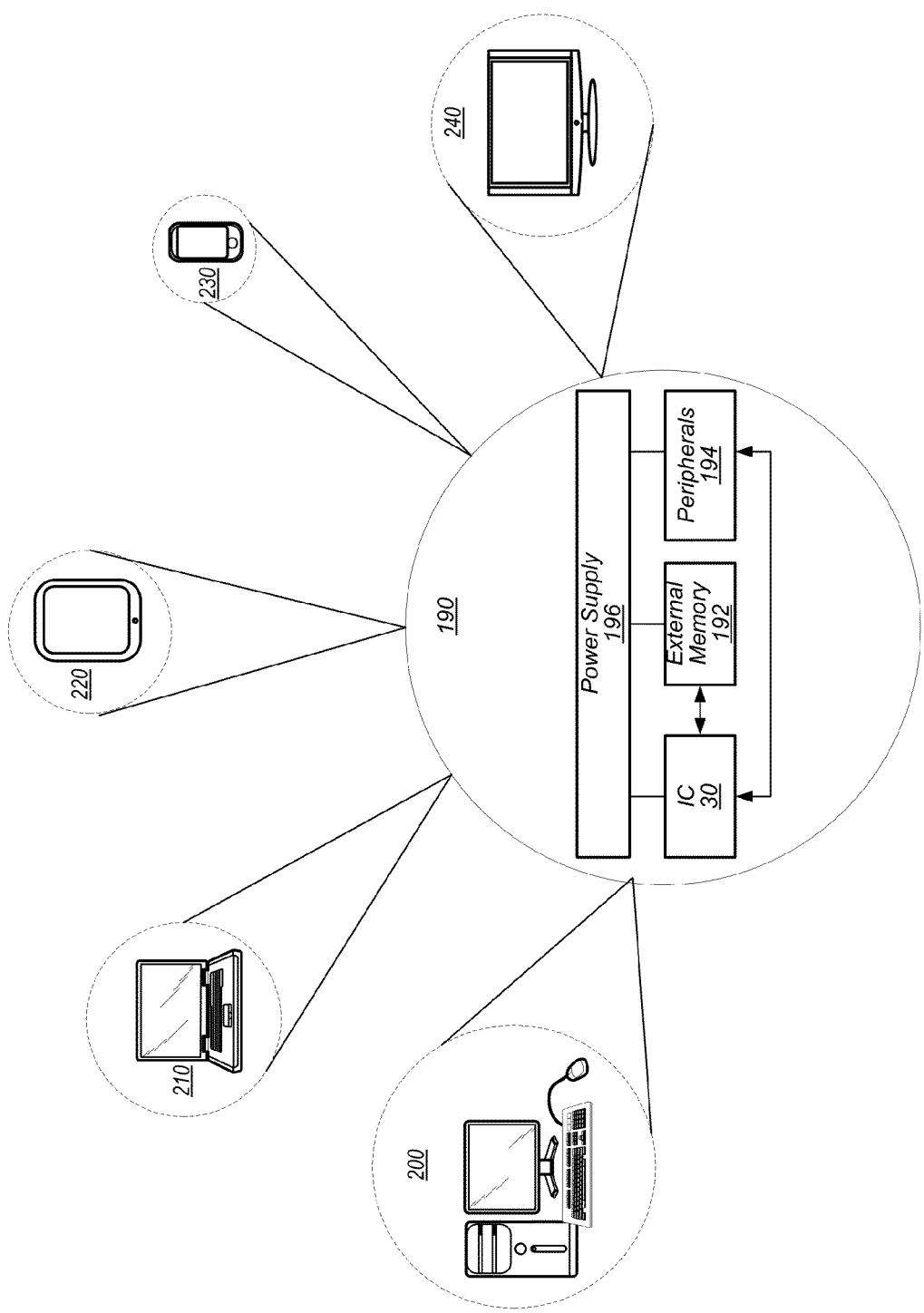
FIG. 10 is a block diagram of one embodiment of a system.

Referring next to FIG. 10, a block diagram of one embodiment of a system 190 is shown. As shown, system 190 may represent chip, circuitry, components, etc., of a desktop computer 200, laptop computer 210, tablet computer 220, cell phone 230, television 240 (or set top box configured to be coupled to a television), or otherwise. Other devices are possible and are contemplated. In the illustrated embodiment, the system 190 includes at least one instance of IC 30 (of FIG. 2) coupled to an external memory 192.

IC 30 is coupled to one or more peripherals 194 and the external memory 192. A power supply 196 is also provided which supplies the supply voltages to IC 30 as well as one or more supply voltages to the memory 192 and/or the peripherals 194. In various embodiments, power supply 196 may represent a battery (e.g., a rechargeable battery in a smart phone, laptop or tablet computer). In some embodiments, more than one instance of IC 30 may be included (and more than one external memory 192 may be included as well).

The memory 192 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 30 in a chip-on-chip configuration, a package-on-package configuration, or a multi-chip module configuration.

The peripherals 194 may include any desired circuitry, depending on the type of system 190. For example, in one embodiment, peripherals 194 may include devices for various types of wireless communication, such as wifi, Bluetooth, cellular, global positioning system, etc. The peripherals 194 may also include additional storage, including RAM storage, solid state storage, or disk storage. The peripherals 194 may include user interface devices such as a display screen, including touch display screens or multitouch display screens, keyboard or other input devices, microphones, speakers, etc.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A method comprising:
   receiving a first request at a system cache configured to store a plurality of cache lines, the system cache having an associated tag memory configured to store a plurality of tags corresponding to the plurality of cache lines, wherein each tag of the plurality of tags includes an associated state field configured to indicate at least a sticky state used in a cache replacement policy, wherein the first request includes a first cache hint field configured to support at least a do not allocate hint and a de-allocate hint; and causing a first cache line to be de-allocated from the system cache, responsive to the first request hitting the first cache line and determining a source of the first request is a same source that caused the first cache line to be allocated in the system cache;

wherein said cache hint is provided by a source of the request and comprises at least one of a do not allocate and a de-allocate indication, wherein a do not allocate cache hint prevents a corresponding cache line from being allocated if the request hits in the system cache, and a de-allocate cache hint prevents a corresponding cache line from being allocated and causes a cache line to be de-allocated responsive to a hit.

2. The method as recited in claim 1, wherein the first request includes an address field and a cache hint field different from the address field, wherein the cache hint is included in the cache hint field.

3. The method as recited in claim 2, wherein a first cache line storage location stores the first cache line, and wherein the first cache line is replaced responsive to the system cache allocating the first cache line storage location to store a cache line for a subsequent request that misses in the system cache.

4. The method as recited in claim 1, further comprising preventing a cache line from being allocated in the system cache for the first request, responsive to the first request missing in the system cache.

5. The method as recited in claim 4, further comprising:
receiving a second request at the system cache, wherein the second request includes a second cache hint, and wherein the second cache hint is a do not allocate cache hint; and
preventing a cache line from being allocated in the system cache for the second request, responsive to the second request missing in the system cache.

6. The method as recited in claim 5, further comprising maintaining a second cache line in a sticky state, responsive to the second request hitting the second cache line, wherein a state of the second cache line is sticky.

7. The method as recited in claim 5, further comprising maintaining a current state of a second cache line responsive to the second request hitting the second cache line.

8. The method as recited in claim 1, wherein the first request is generated by a first requesting agent, and wherein the first request comprises at least one of an allocate normal, allocate sticky, do not allocate, and de-allocate indication.

9. A method comprising:
generating a request, wherein the request includes a cache hint field configured to support at least a do not allocate hint and a de-allocate hint, and wherein the cache hint is based on a type of data being referenced by the request;
conveying the request to a system cache configured to store a plurality of cache lines, the system cache having an associated tag memory configured to store a plurality of tags corresponding to the plurality of cache lines, wherein each tag of the plurality of tags includes an associated state field configured to indicate at least a sticky state used in a cache replacement policy;
receiving the request at the system cache; and
determining how to process the request based on the cache hint included with the request;
wherein said cache hint is provided by a source of the request and comprises at least one of a do not allocate and a de-allocate indication, wherein a do not allocate cache hint prevents a corresponding cache line from being allocated if the request hits in the system cache, and a de-allocate cache hint prevents a corresponding cache line from being allocated and causes a cache line to be de-allocated responsive to a hit.

10. The method as recited in claim 9, further comprising allocating a cache line for the request and setting a state of the cache line to non-sticky responsive to the request having an allocate normal cache hint, the request missing in the system cache, and the system cache having a cache line storage location available.

11. The method as recited in claim 9, wherein the cache hint further comprises at least one of an allocate normal and allocate sticky indication.

12. The method as recited in claim 11, wherein the requesting agent is a processor core.

13. The method as recited in claim 11, wherein the requesting agent is a thread executing on a processor core.

14. A cache configured to:
store a plurality of cache lines in a data memory;
store a plurality of tags corresponding to the plurality of cache lines, wherein each tag of the plurality of tags includes an associated state field configured to indicate at least a sticky state used in a cache replacement policy;
receive requests for accessing memory, wherein each received request includes a cache hint field configured to support at least a do not allocate hint and a de-allocate hint; and
cause a first cache line with a sticky state to be de-allocated from the cache responsive to detecting a hit to the first cache line by a first request with a de-allocate cache hint;
wherein said cache hint is provided by a source of the request and comprises at least one of a do not allocate and a de-allocate indication, wherein a do not allocate cache hint prevents a corresponding cache line from being allocated if the request hits in the system cache, and a de-allocate cache hint prevents a corresponding cache line from being allocated and causes a cache line to be de-allocated responsive to a hit.

15. The cache as recited in claim 14, wherein the cache is further configured to prevent a cache line from being allocated for the first request responsive to detecting the first request misses in the cache.

16. The cache as recited in claim 14, wherein each received request includes a group ID, wherein the cache comprises a configuration register for each group ID, wherein each configuration register is configured to store an indicator specifying if cache hints are enabled for the corresponding group ID.

17. The cache as recited in claim 14, wherein responsive to detecting a hit to a second cache line with a sticky state for a second request with a do not allocate cache hint, the cache is configured to maintain the second cache line in a sticky state.

18. The cache as recited in claim 17, wherein the cache is further configured to prevent a cache line from being allocated for the second request responsive to detecting the second request misses in the cache.

19. A memory controller comprising a system cache, wherein the system cache comprises:
a data memory configured to store a plurality of cache lines;
a tag memory configured to store a plurality of tags corresponding to the plurality of cache lines, wherein each tag of the plurality of tags includes an associated state field configured to indicate at least a sticky state used in a cache replacement policy; and
a control unit configured to:
receive a request, wherein the request includes a cache hint field configured to support at least a do not allocate hint and a de-allocate hint; and determine whether to allocate a cache line for the request based at least in part on the cache hint;

wherein said cache hint is provided by a source of the request and comprises at least one of a do not allocate and a de-allocate indication, wherein a do not allocate cache hint prevents a corresponding cache line from being allocated if the request hits in the system cache, and a de-allocate cache hint prevents a corresponding cache line from being allocated and causes a cache line to be de-allocated responsive to a hit.

20. The memory controller as recited in claim 19, wherein each of the plurality of tags includes a state field, wherein the control unit is configured to assign a value to the state field of a tag, and wherein the value is dependent on a cache hint of a corresponding request.

21. The memory controller as recited in claim 19, wherein the request includes an address field and a cache hint field different from the address field, wherein the cache hint is included in the cache hint field.

22. The memory controller as recited in claim 19, wherein the control unit is configured to:

maintain a first cache line in a sticky state, responsive to detecting a hit to the first cache line by a first request with a do not allocate cache hint.

23. The memory controller as recited in claim 19, wherein the cache hint further comprises at least one of an allocate normal and allocate sticky indication.

24. The memory controller as recited in claim 19, wherein each of the plurality of tags includes a group identifier (ID) field, wherein the group ID field identifies a dataflow associated with the cache line, and wherein each request includes a group ID.

* * * * *